United States Patent [19]
Grube

[11] Patent Number: 6,026,366
[45] Date of Patent: Feb. 15, 2000

[54] METHOD FOR PROVIDING SOFTWARE TO A REMOTE COMPUTER

[75] Inventor: Gary W. Grube, Barrington, Ill.

[73] Assignee: Motorola, Inc., Schaumburg, Ill.

[21] Appl. No.: 08/950,502

[22] Filed: Oct. 14, 1997

Related U.S. Application Data

[63] Continuation-in-part of application No. 08/795,905, Feb. 5, 1997, abandoned, which is a continuation of application No. 08/124,616, Sep. 22, 1993, abandoned.

[51] Int. Cl.[7] .................................................. G06F 17/30
[52] U.S. Cl. ............................................. 705/10; 705/26
[58] Field of Search ........................................ 705/10, 26

[56] References Cited

U.S. PATENT DOCUMENTS

| | | | |
|---|---|---|---|
| 4,156,798 | 5/1979 | Doelz ................................. | 179/15 AL |
| 4,654,799 | 3/1987 | Ogaki et al. ............................ | 364/479 |
| 4,887,077 | 12/1989 | Irby, III et al. ..................... | 340/825.47 |
| 5,036,518 | 7/1991 | Tseung ...................................... | 371/32 |
| 5,057,935 | 10/1991 | Williams ................................ | 358/482 |
| 5,193,151 | 3/1993 | Jain ......................................... | 395/200 |
| 5,202,985 | 4/1993 | Goyal ...................................... | 395/600 |
| 5,267,148 | 11/1993 | Kosaka et al. .......................... | 364/408 |
| 5,267,171 | 11/1993 | Suzuki et al. ...................... | 364/479.04 |
| 5,355,327 | 10/1994 | Stent et al. ......................... | 364/551.01 |
| 5,416,840 | 5/1995 | Cane et al. .................................. | 380/4 |
| 5,442,791 | 8/1995 | Wrabetz et al. ........................ | 395/650 |
| 5,495,610 | 2/1996 | Shing et al. ............................. | 395/600 |
| 5,504,921 | 4/1996 | Dev et al. ............................... | 395/800 |
| 5,619,716 | 4/1997 | Nonaka et al. ......................... | 395/800 |
| 5,717,923 | 2/1998 | Dedrick .................................... | 707/102 |

OTHER PUBLICATIONS

Derfler, Frank J. Jr., "LAN management systems: building workghroup solutions", PC Magazine, Nov. 28, 1989, vol. No. v8, Issue No. n20, p. 285(11).

IBM Announcements, "Computergram International", Dec. 11, 1989, Issue No. n1324, p. 5.

Brooks, Roseann McGrath, "Robo to the rescue: CIS' new robo products address your system security and resource accounting needs", DEC Professional, Aug. 1991, vol. No. v10, Issue No. n8, p. 26(1).

Ellison, Carol and Rigney, Steve, "Reap the rewards of LAN inventory programs", PC Sources, Aug. 1992, vol. No. v3, Issue No. n8, p. 485(7).

IBM Announcements, "Computergram International", Oct. 2, 1992, p. 15.

*Primary Examiner*—Jack M. Choules
*Attorney, Agent, or Firm*—Susan L. Lukasik

[57] ABSTRACT

A communication system (100) employs a method for providing software to a remote computer (e.g., 116) or network server (e.g., 114). The remote computer (or network server) and a host computer (101) each has a radio communication device (102, 115, 117) coupled to it. The remote computer transmits information related to the computer's present configuration to the host computer via the remote computer's radio communication device, wherein such information includes information indicating software applications presently contained within the remote computer. Based on the received configuration information, the host computer determines whether the remote computer is in need of software that compliments the software applications presently contained within the remote computer. When the remote computer is in need of such complimenting software, the host computer selects software applications that compliment the software applications presently contained within the remote computer and transmits a list of the complimenting software to the remote computer via the host computer's radio communication device. Upon receiving the list of complimenting software, the remote computer determines whether it wants to obtain any of the listed software from the host computer and, when it does, selects the desired software from the list. The remote computer then transmits the list of selected software to the host computer via the remote computer's radio communication device. Subsequent to receiving the remote computer's list, the host computer transmits the selected software applications to the remote computer.

14 Claims, 2 Drawing Sheets

METHOD FOR PROVIDING SOFTWARE TO A REMOTE COMPUTER

CROSS-REFERENCE TO RELATED APPLICATIONS

This is a continuation-in-part of application Ser. No. 08/795,905, filed Feb. 5, 1997 now abandoned, which is a continuation of application Ser. No. 08/124,616, filed Sep. 22, 1993 and now abandoned.

FIELD OF THE INVENTION

This invention relates generally to computer networks and, in particular, to a method for exchanging information between a host computer and a plurality of computers and computer networks.

BACKGROUND OF THE INVENTION

Computer networks are known to include a plurality of computers and a server. The server typically stores shared software applications and data bases which any of the computers may access via the network. The computers may be of any type, for example, they may be personal computers, work stations, etc. Within such computer networks, each computer may communicate, via a local area network (LAN), with other computers in the network. For example, one computer may send an electronic mail message or a file to any other computer in the network. In addition, the network allows the computers to share software applications, such that only one software application is needed for a plurality of computers.

As is also known, computer networks may be coupled to other computer networks via telephone lines. Over such connections, networks may further share information and utilize such services as bulletin boards and centralized data bases. As technology continues to advance, the networks can share more and more information and are becoming larger and larger. With such growth, it may be difficult to maintain current software within the network due to the frequent occurrence of software and hardware updates. In addition, notwithstanding the availability of office-type combinations of software, such as Microsoft Office, it may be difficult to maintain software in the network that compliments other software in the network due to the frequency at which new software is being made available to the public. For example, if a network contains a drawing software application produced by a vendor and that vendor or another vendor subsequently releases a word processing application that permits drawings from the drawing application to be imported into the word processing application, users of the network must keep a watchful eye on all vendors' software releases in order to determine that the new word processing application exists. If the users inadvertently miss the announcement of the new word processing application, the new application will not be purchased and users of the network may continue to have difficulty creating drawings for use in their word processing-generated reports.

To update software or provide complimenting software to existing computer networks, software must be loaded at the site of the server, where trouble shooting, if needed, is carried out as well. If there are a plurality of communication networks coupled together, each computer network must be serviced independently, thereby requiring a substantial amount of effort and time to update and/or enhance the networks. Alternatively, updates or complimenting software may be transmitted over telephone lines. In this case, a person is not required to be at the site of the server, but each communication network needs to be individually serviced due to the limitations of the public telephone switching network.

In addition to the difficulties in updating software and maintaining complimenting software in computer networks, manufactures of software applications and hardware have a difficult time in obtaining marketing information, such as what software applications are being used, how often they are used, on what types of computers, etc. With this type of marketing information, manufacturers are more efficient in providing updates and/or enhancements of software. However, at present, manufacturers collect such data in a rather static fashion. For example, manufacturers use personal polling, return warranty cards, or sales statistics to acquire marketing information. With these static data collection methods, manufacturers collect only a small portion of the data available which may be weeks or months old by the time it is compiled.

Therefore, a need exists for a method that allows computers and computer networks to easily receive software that compliments software currently contained in the computer or network without requiring computer or network users to continually monitor for new software releases and that allows manufactures to dynamically collect marketing information regarding the structure and services being presently used by the computer networks.

DESCRIPTION OF A PREFERRED EMBODIMENT

Generally, the present invention encompasses a method for providing software to a remote computer or network. The remote computer (or network server) and a host computer each has a radio communication device coupled to it. The remote computer transmits (e.g., periodically) information related to the computer's present configuration to the host computer via the remote computer's radio communication device, wherein such information includes information indicating software applications presently contained within the remote computer. Based on the received configuration information, the host computer determines whether the remote computer is in need of software that compliments the software applications presently contained within the remote computer. When the remote computer is in need of such complimenting software, the host computer selects software applications that compliment the software applications presently contained within the remote computer and transmits a list of the complimenting software to the remote computer via the host computer's radio communication device.

Upon receiving the list of complimenting software, the remote computer determines whether it wants to obtain any of the listed software from the host computer and, when it does, selects the desired software from the list. The remote computer then transmits the list of selected software to the host computer via the remote computer's radio communication device. Subsequent to receiving the remote computer's list, the host computer transmits the selected software applications to the remote computer.

By providing software to remote computers in this manner, the present invention allows software manufacturers to rapidly provide software users with up-to-date information regarding newly released software applications that may benefit the users based on the users' current software portfolios.

Figure 1:
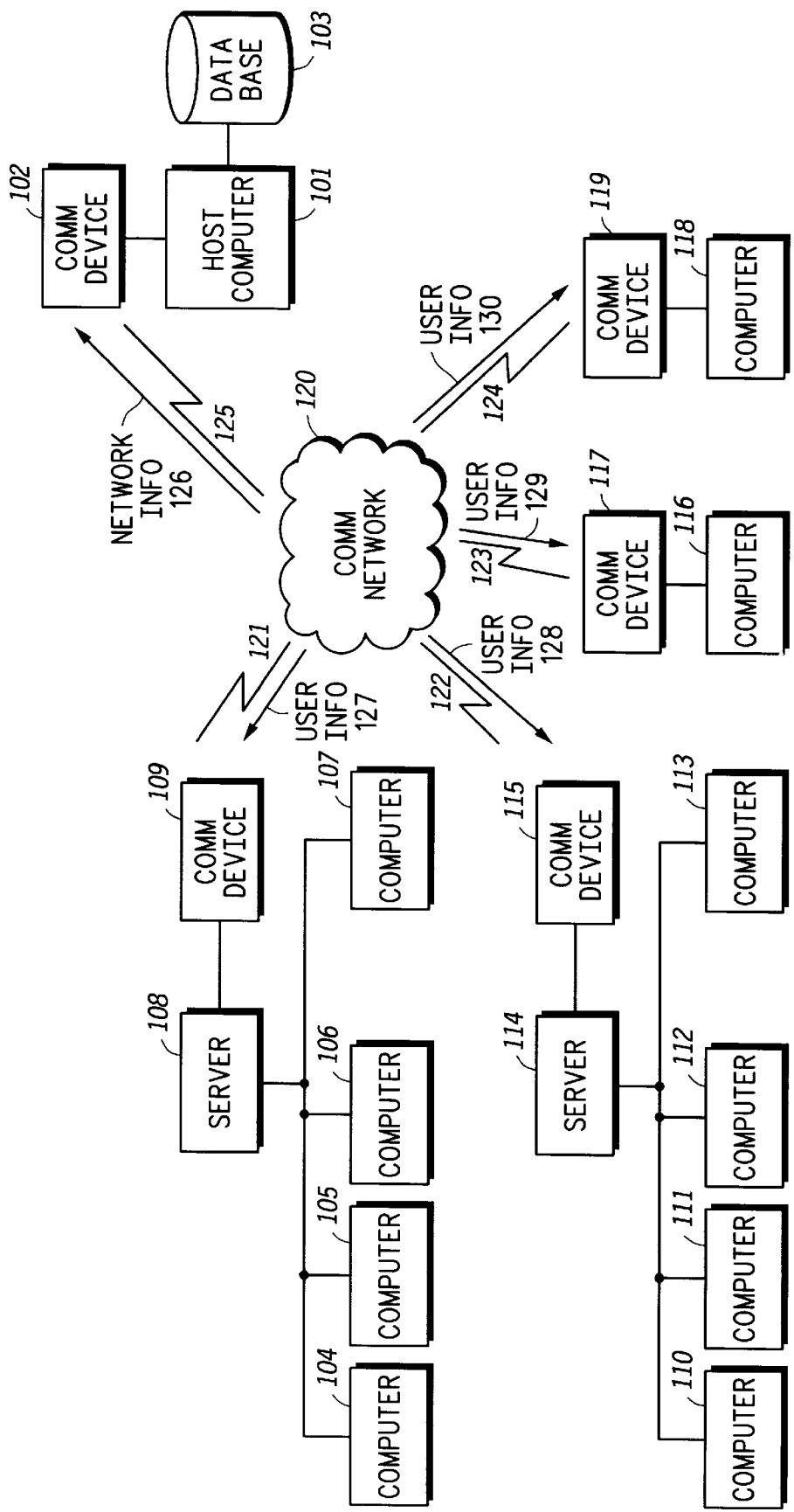
FIG. 1 illustrates a schematic diagram of a plurality of computer networks, a plurality of computers, and a host computer coupled together through a communication network in accordance with the present invention.

The present invention can be more fully described with reference to FIGS. 1 and 2. FIG. 1 illustrates a global schematic of a computer area 100. The computer area 100 includes a plurality of computer networks, a plurality of computers, and a host computer 101. Host computer 101 comprises a communication device 102, and a data base 103, which may be RAM, disc, magnetic storage, or any other means for storing digital information. Of the two computer networks shown, one includes computers 104–107, which may be any type of personal computer, workstation, or other type of computing device. The network also includes a server 108, which may be a supervisory computer, that is coupled to a communication device 109. The other computer network includes computers 110–113, a server 114 and a communication device 115. As in the other computer network, the computers may be personal computers or work stations, where the server is a computer dedicated to serve the system. Communication devices 102, 109 and 115 may be RF radios which may be an RF radio that transceives information over wireless communication resources or channels.

Computer area 100 further includes separate computers 116 and 118 that are each coupled to communication devices 117 and 119. Computers 116 and 118 may be personal computers or workstations and communication devices 117 and 119 may be RF radios. If the communication network 120 is a telephone system as opposed to a wireless communication system, communication devices 102, 109, 115, 117, and 119 would be modems.

In computer area 100, host computer 101 communicates information over radio frequency (RF) communication channels to communication devices 102, 109, 115, 117, and 119 via wireless communication network 120. In a preferred embodiment, communication network 120 is a trunked communication system, a multi-site trunked communication system, a conventional communication system, or any communication system that transceives information over RF communication channels or resources. In communication system 120, the communication channels may be frequency carriers, pairs of frequency carriers, time division multiplex slots, or code division orthogonal codes.

The information transmitted over the communication channels is either network information 126 or user information 127–130. Network information 126 is transmitted from communication devices 109, 115, 117, 119 via communication network 120 to host computer 101, whereas user information 127–130 is transmitted from host computer 101 to the communication devices 109, 115, 117 and 119. Note that transmission of network information 126 and user information 127–130 is done in a conventional manner within the specific types of communication systems. For example, if communication system 120 is a trunking system, host computer 101 would need to request and receive a communication channel to transmit user information 127–130. Similarly, a communication channel would have to be requested and granted to transmit network information 126. Formatting of network information 126 and user information 127–130 may be any type that is compatible with the system type. Thus, no further discussion will be presented on the manner of transmission or the means for transmitting except to facilitate the understanding of the present invention.

Network information 126 preferably includes configuration information and may also include statistical information. The configuration information contains information regarding the platform of the network, or individual computers, and software applications contained within the network, or individual computers. The platform information indicates the type of hardware contained within the network, or within the individual computer. User information 127–130 includes software applications that compliment software applications that are contained within the network or individual computers. How network information 126 and user information 127–130 are utilized and conveyed will be discussed below.

Figure 2:
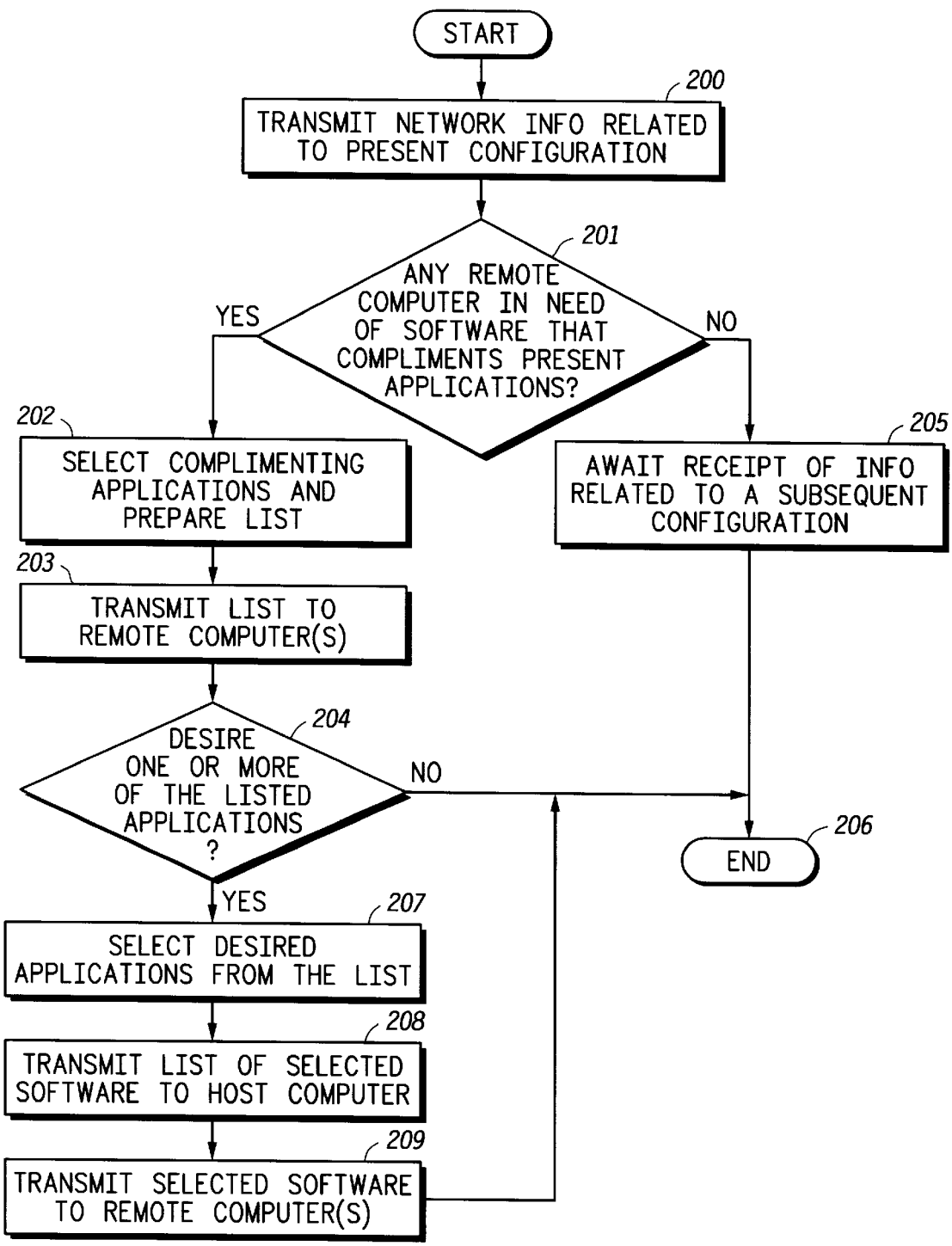
FIG. 2 illustrates a logic diagram that may be utilized to implement the present invention.

FIG. 2 illustrates a logic diagram that may be used to implement the present invention. At step 200, each remote server of a computer network (or each remote computer in a separate computer area) transmits network information to a host computer via a radio communication channel. In a preferred embodiment, the transmissions of network information occur periodically (e.g., once a month). As mentioned above, the network information preferably includes information indicating the identities of the software applications presently contained within the server or computer, and may also include statistical information or information indicating a hardware platform of the server or computer. Statistical information indicates how many times a particular software application is used, how often the network or computer is used, and any other type of statistical information that may be compiled regarding the use of the network or computer. Hardware platform information indicates the number of computers in the network, the types of computers, and any other type of platform information.

Upon receiving the network information, the host computer determines (201) if any computers, or servers, (users) are in need of software (complimenting software) that compliments the software applications presently contained within the computer or server. The host computer may determine that a computer or server is in need of complimenting software when the host computer determines that a software application (e.g., a spreadsheet application) that compliments another software application (e.g., a word processing application) is not contained in the network information received from the server or computer. In the preferred embodiment, the host computer maintains a database of complimenting software applications. Accordingly, when the host computer receives a remote computer's network information, the host computer compares each software application identified in the network information with that application's complimenting applications, if any, stored in the database. Upon determining that the remote computer does not have a particular complimenting application, the host computer determines that the remote computer is in need of complimenting software.

If no servers or computers are in need of complimenting software, the host computer awaits (205) receipt of information related to a subsequent configuration of the computers or servers and the logic flow ends (206). If, on the other hand, a computer or server is in need of complimenting software, the host computer accesses its database and selects (202) respective complimenting applications for each computer or server so in need and prepares respective lists of the complimenting applications, including appropriate identifiers (e.g., names) of the selected applications. The host computer then transmits (203) the lists of complimenting software to their respective remote computer or server via a radio communication channel. In the event that all computers or servers are in need of the same complimenting software (e.g., when multiple computers or servers at a company transmit similar network information), the host computer may broadcast a single list to all such computers or servers instead of transmitting individual lists.

Upon receiving a list of complimenting software, the remote computer or server (or a user thereof) determines (204) whether it desires to obtain one or more of the listed software applications. When the computer or server does not desire to obtain any of the listed software applications, the logic flow ends (206). However, when the computer or server does desire to obtain one or more of the listed software applications, the computer or server selects (207) the desired applications and transmits (208) a list of selected software to the host computer. The list of selected software transmitted by the remote computer or server is a subset of (i.e., contains all or some portion of) the software identified in the list of complimenting software that was transmitted to the remote computer or server by the host computer.

Once the host computer receives the list of selected software from the remote computers or servers, the host computer transmits (209) the selected software to the respective computers or servers. In the event that multiple computers or servers request the same software, the host computer may broadcast the common software simultaneously to those computers or servers that requested it, instead of individually transmitting the software. In this manner, the host computer may transmit user information (e.g., complimenting software applications) simultaneously to multiple servers and stand alone computers. This global transmission of user information may be done simultaneously over the RF communication channel such that millions of computers may be reached at one time. This type of simultaneous transmission of user information is not obtainable with public telephone switching networks unless a telephone line is allocated to each network and computer. Thus, to achieve the coverage that can be obtained with an RF communication channel as disclosed by the present invention, up to hundreds of telephone lines would be required.

The host computer may do considerably more with the network information than provide specific user information. For example, the network information may be used to verify that software applications stored at each computer network, or computer are authorized copies of the software applications. If the copies are not authorized, the host computer may send a message indicating that the software is not authorized and request that it be destroyed. The host computer may also transmit a message that disables the software application, or send an authorized copy of the software and bill the user of the computer or network. All of this can be done over an RF communication channel with very little expense to the operator of the host computer. In addition to monitoring for unauthorized copies of software applications, the host computer may use the network information to generate user marketing reports. Because the RF channels can reach literally millions of computers at one time, a tremendous amount of data may be dynamically obtained. Thus, marketing information that is hours old containing a substantial amount of data may be used by manufactures to obtain a much improved reading of the marketplace as to opposed to the prior art static methods of collecting such data.

As a working example of the above, consider a computer area that has several networks and several stand alone computers. The computer networks include several computers, a server and a communication device. Each of the individual or stand alone computers is coupled to communication device, wherein the communication device can transceive information to and from a host computer which is also coupled to a communication device. In such an environment, network information is transmitted from time-to-time from the communication devices associated with the server or individual computers to the host computer. The transmission may be initiated independently by the server, or individual computer, on a timed basis such as once a month or at some other interval. In addition, the transmission may be initiated in response to the host computer sending a request for information transmission. The network information, as mentioned above includes specific information regarding the configuration of the networks. This type of network information may be compiled to provide specific customer information. For example, the information may indicate the type of computers that are associated with the network, the software applications used, how often the computers are used, how often the software is used, if the software is being utilized in an unauthorized manner, and the number of users sharing a specific application. Upon receiving this information, the host computer can compile it to provide the marketing information. With such marketing information, the manufacturers have a dynamic means for assessing how its product is being utilized within the market place.

In exchange for receiving the network information, the host computer provides specific user information (complimenting software applications) to the networks. For example, upon receiving the network information, the host computer may determine that a specific network does not have a software application that is intended to or otherwise would compliment a software application that the network does have. Accordingly, the host computer transmits, over the RF channel, the identity of the complimenting software application and how much the application would cost. If the user wants the complimenting application, a message is sent, over the RF channel, to the host computer indicating the desire to purchase the complimenting software. In response, the complimenting software is transmitted, over the RF channel, to the network where it can be immediately used. In addition, when the host computer has general information, such as a new software program is available, the host computer only needs to transmit the message once and it will be received by a multitude of computers. Thus saving the manufacturer considerable amounts of money in advertising and production of disks.

The present invention provides a method for providing software to computer networks or stand alone computers. With such a method, a host computer can dynamically compile marketing information that indicates the types of hardware and software being used as well as the frequency of use, which was not available prior to this invention. In exchange for the network information, the host computer can provide complimenting software either individually or simultaneously to a multitude of computer networks and computers over an RF channel. Prior to this invention such user information could only be provided on a disk or over a telephone line to one computer or one network at a time. Moreover, the present invention allows computer users to easily stay abreast of new software releases and the relationship, if any, between a newly released software application and the software already being used by the users.

I claim:

1. A method for a host computer to provide software to a remote computer, the method comprising the steps of:

receiving, from the remote computer via a radio communication device coupled to the host computer, network information related to a present configuration of the remote computer, wherein the network information includes at least information indicating software applications presently contained within the remote computer;

determining, based on the network information, whether the remote computer is in need of software that compliments the software applications presently contained within the remote computer;

when the remote computer is in need of software that compliments the software applications presently contained within the remote computer,
selecting at least one software application that compliments the software applications presently contained within the remote computer;
transmitting a list of complimenting software to the remote computer via the radio communication device, wherein the list of complimenting software includes an identifier for the at least one software application;
receiving, from the remote computer via the radio communication device and responsive to the step of transmitting the list of complimenting software, a list of software desired by the remote computer to produce selected software, wherein the list of software desired by the remote computer is a subset of the list of complimenting software; and
transmitting, via the radio communication device, the selected software to the remote computer.

2. The method of claim 1, wherein the network information further comprises information indicating a hardware platform of the remote computer.

3. The method of claim 1, further comprising the step of receiving, from the remote computer via the radio communication device, information related to statistical use of software applications contained within the remote computer.

4. The method of claim 3, further comprising the step of generating user marketing reports based on the information related to statistical use of software applications contained within the remote computer.

5. The method of claim 1, wherein the step of receiving information from the remote computer comprises the step of receiving information from a server computer of a multiple computer network.

6. The method of claim 1, further comprising the step of, when the remote computer is not in need of software that compliments the software applications presently contained within of the remote computer, awaiting receipt of information related to a subsequent configuration of the remote computer.

7. A method for a host computer to provide software to a plurality of remote computers, the method comprising the steps of:
receiving, from each remote computer of the plurality of remote computers via a radio communication device coupled to the host computer, network information related to a present configuration of the respective remote computer, wherein the network information includes at least information indicating software applications presently contained within the respective remote computer;
determining, based on the network information, whether at least two remote computers are in need of software that compliments software applications presently contained within the at least two remote computers;
when at least two remote computers are in need of software that compliments software applications presently contained within the at least two remote computers,
selecting at least one software application that compliments the software applications presently contained within the at least two remote computers;
transmitting a list of complimenting software to the at least two remote computers via the radio communication device, wherein the list of complimenting software includes an identifier for the at least one software application;
receiving, from each of the at least two remote computers via the radio communication device and responsive to the step of transmitting the list of complimenting software, a list of software desired by the respective remote computer to produce selected software, wherein the list of software desired by the respective remote computer is a subset of the list of complimenting software;
determining software that is common to at least two lists of selected software to produce common selected software; and
transmitting, via the radio communication device, the common selected software simultaneously to the at least two remote computers.

8. The method of claim 7, wherein the network information further comprises information indicating a hardware platform of the remote computer.

9. The method of claim 7, wherein the step of receiving information from each remote computer comprises the step of receiving information from each server computer of a multiple computer network that includes a plurality of server computers.

10. A method for a remote computer to obtain software from a host computer, the method comprising the steps of:
transmitting, to the host computer via a radio communication device coupled to the remote computer, network information related to a present configuration of the remote computer, wherein the network information includes at least information indicating software applications presently contained within the remote computer;
receiving, from the host computer via the radio communication device, a list of complimenting software that includes an identifier for at least one software application that compliments the software applications presently contained within the remote computer;
determining whether to obtain from the host computer at least one software application in the list of complimenting software;
upon determining to obtain at least one software application,
selecting at least one software application from the list of complimenting software to produce selected software;
transmitting, via the radio communication device, a list of selected software to the host computer, wherein the list of selected software is a subset of the list of complimenting software; and
receiving, from the host computer via the radio communication device, at least one software application identified in the list of selected software.

11. The method of claim 10, wherein the network information further comprises information indicating a hardware platform of the remote computer.

12. The method of claim 10, further comprising the step of transmitting, via the radio communication device, information related to statistical use of software applications contained within the remote computer.

13. The method of claim 10, wherein the remote computer is a server computer of a multiple computer network.

14. The method of claim 10, wherein the step of transmitting network information related to a present configuration of the remote computer comprises the step of periodically transmitting network information related to a present configuration of the remote computer.

* * * * *